United States Patent
Geitner et al.

(10) Patent No.: US 12,153,413 B2
(45) Date of Patent: Nov. 26, 2024

(54) VIRTUAL SENSOR ON A HIGHER-LEVEL MACHINE PLATFORM

(71) Applicant: Siemens Aktiengesellschaft, Munich (DE)

(72) Inventors: André Geitner, Eggolsheim (DE); Udo Heckel, Wendelstein (DE); Tim Kaiser, Kleinsendelbach (DE); Daniel Klein, Kastl (DE); Daniel Petzold, Fürth (DE); Edison de Faria Siqueira, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 459 days.

(21) Appl. No.: 17/441,940

(22) PCT Filed: Feb. 28, 2020

(86) PCT No.: PCT/EP2020/055254
§ 371 (c)(1),
(2) Date: Sep. 22, 2021

(87) PCT Pub. No.: WO2020/193070
PCT Pub. Date: Oct. 1, 2020

(65) Prior Publication Data
US 2022/0163952 A1 May 26, 2022

(30) Foreign Application Priority Data
Mar. 27, 2019 (EP) .................... 19165483

(51) Int. Cl.
*G05B 19/418* (2006.01)
(52) U.S. Cl.
CPC ... *G05B 19/41885* (2013.01); *G05B 19/4183* (2013.01); *G05B 2219/37537* (2013.01)

(58) Field of Classification Search
CPC .......... G05B 19/41885; G05B 19/4183; G05B 2219/37537
See application file for complete search history.

(56) References Cited

U.S. PATENT DOCUMENTS

| | | | |
|---|---|---|---|
| 8,793,004 B2 * | 7/2014 | Grichnik ............ | G05B 23/0235 700/47 |
| 2007/0118338 A1 | 5/2007 | Grichnik | |

(Continued)

FOREIGN PATENT DOCUMENTS

| | | |
|---|---|---|
| CN | 101331504 A | 12/2008 |
| CN | 101681155 A | 3/2010 |

(Continued)

OTHER PUBLICATIONS

Benner, Peter, et al. "Comparison of model order reduction methods for optimal sensor placement for thermo-elastic models." Engineering Optimization 51.3 (2019): 465-483.

(Continued)

*Primary Examiner* — Mohammad Ali
*Assistant Examiner* — Sheela Rao
(74) *Attorney, Agent, or Firm* — Lempia Summerfield Katz LLC

(57) ABSTRACT

The invention relates to a method for providing a virtual sensor in an automation system of an industrial system. A measurement value of a physical sensor, said measurement value corresponding to a physical parameter of the industrial system, is received in a processing device of the automation system. A data set which has been generated using a simulation model is provided in the processing device, wherein the data set produces a unique relationship between possible measurement values of the physical sensor and corresponding output values of the virtual sensor. The data set and the received measurement value are used to determine which output value of the virtual sensor belongs to the received (Continued)

measurement value (20), and said output value is then displayed on a display device of the industrial system.

19 Claims, 4 Drawing Sheets

(56) References Cited

U.S. PATENT DOCUMENTS

| | | | |
|---|---|---|---|
| 2008/0021681 A1* | 1/2008 | Grichnik | G06N 3/126 |
| | | | 703/2 |
| 2008/0312756 A1 | 12/2008 | Grichnik | |
| 2014/0330400 A1 | 11/2014 | Markert | |
| 2015/0134313 A1 | 5/2015 | Maturana | |
| 2016/0098501 A1* | 4/2016 | Reitman | G06F 30/20 |
| | | | 703/1 |
| 2017/0351509 A1* | 12/2017 | Lora | G06F 8/70 |
| 2018/0025558 A1 | 1/2018 | Chen | |
| 2018/0060725 A1 | 3/2018 | Groh | |
| 2018/0300124 A1* | 10/2018 | Malladi | H04L 12/283 |

FOREIGN PATENT DOCUMENTS

| | | |
|---|---|---|
| CN | 104678778 A | 6/2015 |
| CN | 105334746 A | 2/2016 |
| CN | 107628036 A | 1/2018 |
| CN | 107784151 A | 3/2018 |
| CN | 108353090 A | 7/2018 |
| CN | 108535033 A | 9/2018 |

OTHER PUBLICATIONS

International Search Report and the Written Opinion for International Patent Application PCT/EP2020/055254 mailed Jun. 15, 2020.
Maloney, Peter J., and Peter M. Olin. Pneumatic and thermal state estimators for production engine control and diagnostics. No. 980517. SAE Technical Paper, 1998. pp. 1-14.
Most, Thomas, and Johannes Will. "Metamodel of Optimal Prognosis-an automatic approach for variable reduction and optimal metamodel selection." Proc. Weimarer Optimierungs-und Stochastiktage 5 (2008): 20-21. pp. 1-22.
Notice of Submission the International Provisional Patentability Report for International Patent Application No. PCT/EP2020/055254 mailed Jul. 9, 2021.
Sheikholeslami, Razi, and Saman Razavi. "Progressive Latin Hypercube Sampling: An efficient approach for robust sampling-based analysis of environmental models." Environmental Modelling & Software 93 (2017): 109-126.
Top, Philip, Yining Qin, and Liang Min. "Integration of functional mock-up units into a dynamic power systems simulation tool." 2016 IEEE Power and Energy Society General Meeting (PESGM). IEEE, 2016. pp. 1-5.

* cited by examiner

VIRTUAL SENSOR ON A HIGHER-LEVEL MACHINE PLATFORM

RELATED CASE

The present patent document is a § 371 nationalization of PCT Application Serial Number PCT/EP2020/055254, filed Feb. 28, 2020, which claims priority to EP 19165483.9, filed Mar. 27, 2019, which are hereby incorporated by reference.

FIELD

The present invention relates to a method for virtual sensors in an automation system, and in particular a method for providing virtual sensors on a higher-level machine platform in an industrial installation that are operated to complement physical sensors on the installation.

Further, a corresponding automation system and computer program are provided.

BACKGROUND

In order to be able to monitor and control a mechanical production in an industrial installation, it is necessary to process numerous measured values on machine components and to provide said measured values to the operator on a machine platform, i.e., a hardware and software computer system on a higher level than the industrial installation.

Accordingly, conventional methods can involve measurement data being captured by way of physical sensors on the individual machine components. Physical sensors can be mounted on machine components in this case in order to capture measurement data, e.g., by way of control units. These measurement data can be provided on a human-machine interface (HMI) or a platform, for example a higher-level machine platform such as an Edge computing system. By way of example, to measure the temperature on a motor, a suitable temperature sensor can accordingly be placed on the motor at a measurement site with good thermal bonding.

The documents US 2018/300124 A1, US 2016/098501 A1, Peter J Maloney ET AL: "Pneumatic and Thermal State Estimators for Production Engine Control and Diagnostics" (SAE Technical Paper Series—Electronic Engine Controls 1998), TOP PHILIP ET AL: "Integration of functional mock-up units into a dynamic power systems simulation tool" (2016 IEEE POWER AND ENERGY SOCIETY GENERAL MEETING (PESGM), IEEE, Jul. 17, 2016), SHEIKHOLESLAMI RAZI ET AL: "Progressive Latin Hypercube Sampling: An efficient approach for robust sampling-based analysis of environmental models" (ENVIRONMENTAL MODELLING & SOFTWARE, ELSEVIER, AMSTERDAM, NL, vol. 93, Mar. 23, 2017) already disclose aspects of virtual sensors.

The document US 2018/300124 A1 already involves the use of a machine learning method that learns from the measurements of a physical sensor. US 2016/098501 A1 discloses the use of a simulation directly linked to a physical sensor. The publication by TOP PHILIP ET AL is concerned with "Functional mock up units". The publication by Peter J Maloney ET AL is concerned with models for determining vapor states. The publication by SHEIKHOLESLAMI RAZI ET AL is concerned with simulation in general.

Depending on the type and location of the quantity to be measured, this can require complex sensors and measuring devices, however. Also, it may be that a measured value cannot be ascertained because the metrology would influence the actual process/procedure. By way of example, when measuring the flow rate within a nozzle, the flow can be decisively influenced by the measuring equipment.

Also, a measurement can usually involve only a single local value being captured, but not entire fields. Any slight change in the measurement position leads to a change in the measurement setup, which can necessitate complex readjustment, modification, and also recalibration. Moreover, older machines and installations can usually be equipped with additional metrology only with a great deal of effort.

On the other hand, detailed digital simulation models are created and compared against reality during machine, process, or product development already. These digital prototypes can be used to determine almost all physical quantities considered during the simulation without complex sensor setups. The measurement position or the measurement setup can be varied easily and inexpensively, and the actual process/procedure is not influenced during the measurement.

Conventional simulation models normally require a long processing time of between up to several hours and days. Even the smallest parameter changes on a conventional simulation model therefore result in it being necessary to wait a long time for the new results.

One problem of the simulation models, however, is that use of the simulation models entails a long processing time, they are usually available only to experts, and they often need to be developed in special expert software.

Increasing digitization has resulted in not only physical sensors but also virtual sensors or so-called soft sensors being developed, which are another way of providing measurement data of an industrial installation.

Virtual sensors can fundamentally be generated using three different methods. First, rigorous modelling is possible, wherein a description relating to principles, e.g., laws of nature or perhaps relating to simulation models, is provided. In addition, statistical regression methods, such as for example derivation of regression curves from existing datasets, can be used. Moreover, artificial intelligence (AI) algorithms or cluster analyses, which provide derivation of rules and principles from existing data, can be used.

A so-called "model order reduction" method allows the processing time to be shortened. In simple cases, this is so successful that the reduced model can react to parameter changes almost in real time. If the measurement data on a reduced model are explicitly retrieved at one site, this results in a virtual sensor, as is known from the document "Comparison of model order reduction methods for optimal sensor placement for thermo-elastic models" by Benner, Herzog, Lang, Riedel and Saak, in Engineering Optimization, 51 (3), 465-483, 2017. In cases of models with a multiplicity of parameters, however, the longer processing time of a solver for the model means that there is no real-time capability.

Furthermore, known methods using a so-called functional mock-up interface (FMI) represent a simplification. The large number of different simulation domains (e.g., structural mechanics, fluidics, thermal activity) and the far greater number of different software packages that need to interchange simulation data with one another when technical systems are considered across domains mean that the so-called functional mock-up interface (FMI) was brought into being. The aim is to find a standard format that permits the interchange of simulation models/data between the different software packages and is supported by a large number of software packages. This interface can be used not only to interchange simulation models but also to transmit simulation results in abstracted form, which is the basis for virtual sensors on the basis of FMI technology.

Another conventional method is provided by the so-called metamodel of optimal prognosis (MOP). Based on the MOP approach, simulation data are abstracted and are reproduced in a functional mock-up unit (FMU), as is known from the document "Metamodel of Optimal Prognosis—an automatic approach for variable reduction and optimal metamodel selection" by Most, Will in Proceedings of Weimarer Optimierungs- and Stochastiktage, 5, 20-21, 2008. Based on the MOP approach, a specific quantity is predicted by way of as few simulation parameters as possible using a suitable simulation model and a solver, wherein an MOP includes a function that is defined in sections. By way of example, it is possible to ascertain for a relay that the armature position of the relay can be predicted with 93% accuracy if the magnetic flux density and field current of the coil are known. The MOP of the armature position on the basis of flux density and field current can be transferred to an FMU and connected to actually measured data by way of a special interface on a standard PC. The data of the MOP are retrieved by way of a special solver. Using the metamodel of optimal prognosis, however, no real-time-compatible virtual sensors are provided by way of FMUs that can be operated on a higher-level machine platform in an automation system in order to complement the actual measurement data from machines and components. Furthermore, it is not possible to use an MOP without a special solver, since, based on the MOP approach, a conventional measurement of the armature position for known parameters is replaced by calculation of an optimized simulation, with an armature position being predicted on the basis of an optimized simulation model. As such, the MOP approach requires an appropriate solver to be present that is capable of outputting the target quantity on the basis of the input measured quantity.

There is therefore a need for an improved method for providing a virtual sensor in an automation system, which virtual sensor can be operated directly on a higher-level machine platform in addition to actual physical sensors and has improved real-time capability and simpler implementation.

SUMMARY

This object is achieved by the features of the independent claims. The dependent claims describe other exemplary embodiments.

According to a first aspect, a method for providing a virtual sensor in an automation system of an industrial installation is provided.

In a first act, a measured value of a physical sensor that corresponds to a physical parameter of the industrial installation is received in a processing device of the automation system.

The processing device can be part of a machine platform on a higher level than the industrial installation, in particular of an Edge computing system. The processing device of the automation system can be an installation-independent, or system-independent, processing device.

The measured value of the physical sensor can be a value of a physical measured quantity of the industrial installation, i.e., an installation state value, and can therefore describe a physical state of the industrial installation. The physical sensor can be assigned to the industrial installation or to a machine component of the industrial installation and can therefore provide actual measured values of a physical state of the installation.

In a further act, a dataset that was generated by a simulation model, and that produces a correlation between possible measured values of the physical sensor and associated output values of the virtual sensor, is provided in the processing device.

For example, the output value of the virtual sensor can be a value of a physical measured quantity of the industrial installation that is not measured by a physical sensor, or an installation state value, and can therefore describe, in other words define, a state or a property of the industrial installation.

For example, the dataset can link a respective one of the possible measured values of the physical sensor to an associated output value of the virtual sensor, or in other words can assign said measured value to the associated output value.

For example, the dataset can include a multiplicity of possible measured values of the physical sensor and a multiplicity of associated output values of the virtual sensor that in each case result in a measured value and an associated output value being linked to one another as a pair, which means that each measured value is assigned an associated output value by its lookup table.

For example, the dataset can include an association specification that provides a unique association between the measured values and the respective output values. Such an association specification can be a simple function that contains, as a variable, the measured quantity of the physical sensor; this allows a calculation to be performed without a simulation, i.e., without a solver function, for example by an executable of an FMU.

In a further act, the processing device determines, on the basis of the dataset and on the basis of the received measured value, which output value of the virtual sensor belongs to the received measured value.

For example, the dataset is used to assign an output value of the virtual sensor to the measured value of the physical sensor.

In a further act, which is optional in some exemplary embodiments, the determined output value is displayed on a display apparatus.

In some exemplary embodiments, the automation system, the higher-level machine platform, or the industrial installation can include the display apparatus. The display of the determined output value can include display of the received measured value.

In some exemplary embodiments, the received measured value of the physical sensor can also be displayed on the display apparatus.

The method according to one embodiment therefore combines actual measurement data with simulation models with virtual sensors that can be operated directly on a higher-level machine platform in addition to the actual physical sensors, and therefore brings the advantages of simulation models to the actual factory. The data of a "reduced simulation" can therefore be presented on a higher-level platform in the factory setting in order to complement actual measurement data, allowing rigorous modelling and statistical regression methods to be combined.

The conventional metamodels, in particular n-dimensional functions, linear functions, tables or technical fundamental equations that the dataset can include, can be provided independently of manufacturer, allowing faster implementation in an automation system in situ.

The use of simple methods of knowledge representation in the dataset, for example mathematical modelling by metamodels or linear functions, or simple tables, such as lookup tables, allows real-time capability.

According to one embodiment, a virtual sensor is provided that is designed to be operated on a higher-level machine platform.

The following advantages are therefore obtained in comparison with real, and thus physical, sensors.

A simple implementation around new sensors in a factory setting is made possible, with no influencing of processes taking place in the industrial installation. In addition, a comparatively fast change in the measurement position of the virtual sensor is made possible, no recalibration of the sensor being required. This can be provided by virtue of at least one other dataset being provided in the processing device, wherein the other dataset is assigned to another measurement position of the virtual sensor. A measurement position of a virtual sensor corresponds here to the position of the virtual sensor at which said virtual sensor is arranged on the industrial installation in accordance with a simulation on the basis of a simulation model. A comparatively fast change in the measurement position is therefore made possible, with no recalibration being required. Moreover, this allows measurement of values that would not be measurable in reality.

The following advantages are therefore obtained in comparison with the method based on model order reduction.

By using a standard format for the dataset, operation on many platforms and software tools becomes possible. It is therefore possible for virtual sensors to be provided independently of the simulation domain. Moreover, a virtual sensor can be provided in a manner reduced to a single sensor point. Furthermore, improved real-time capability of the virtual sensors for small parameter changes is provided.

The method according to one embodiment therefore provides an improved method for providing a virtual sensor in an automation system, which virtual sensor can be operated directly on a higher-level machine platform in addition to actual physical sensors, wherein the method has improved real-time capability and simpler implementation on the higher-level platform.

In some exemplary embodiments, the generating of the dataset can be performed before the other acts.

The generating of the dataset can involve, in a first act, calculating, i.e., simulating, using the simulation model, a multiplicity of output values of the virtual sensor, based on a varying of the possible measured values of the physical sensor, over a predetermined definition area.

Prior to operation of the virtual sensor, a multiplicity of simulations, for example one simulation for each of the possible measured values of the physical sensor, are therefore performed, the results of the simulations representing the output value for the virtual sensor. In this case, the possible measured values can lie within a definition area, which indicates the range in which the possible measured values of the physical sensor can lie.

In a further act, the measured values and the associated output values can be combined in a dataset and stored.

In some exemplary embodiments, fit functions, or statistical regression methods based on the measured values and output values, can be used to fit a single- or multidimensional function to the discrete values. In this case, the dataset contains the fitted function.

The generating of the dataset can be performed by a computer that is not included by the automation system, the higher-level machine platform, or the industrial installation. In particular, the dataset can be generated by a computer remotely from the industrial installation. In this case, the dataset is stored and transmitted to the processing apparatus and stored in the processing device in a permanent memory.

In some exemplary embodiments, the dataset may not be generated based on a simulation model, and/or can contain one or more technical fundamental equations.

The calculating of the dataset can include a performing of a predetermined number of simulations, or calculations, using the simulation model. The performing of simulations can be performed using a Latin hypercube sampling method or a Monte Carlo sampling method.

For the simulation of the values of a dataset, the output values of the virtual sensor can relate to a single sensor point, which can be a critical point or a critical site in the simulation model. For example, simulation parameters that stipulate a location or site of the sensor on the industrial installation for which a state of the installation is supposed to be simulated can be kept constant during the simulation of the dataset. This allows different datasets that are each assigned to a different location of the virtual sensor to be generated.

The providing of the dataset can include a reading of the dataset from a permanent memory of the processing device.

The dataset can include at least one of the following elements: a lookup table, a linear function, an n-dimensional function, and a technical fundamental equation. Said elements can uniquely assign each of the possible measured values of the physical sensor an associated output value of the virtual sensor. In some exemplary embodiments, the dataset can include a single element and/or any combination of the cited elements. The elements, which are a simple knowledge representation, allow fast and real-time-compatible determination of the values of the virtual sensor.

The dataset can be a functional mock-up unit (FMU). In some embodiments, the dataset can be provided in or as a functional mock-up unit. In this case, the dataset can be incorporated, or operated, in the processing device by way of a functional mock-up interface (FMI). A functional mock-up unit can include the following elements: an XML header, an executable, and at least one library.

The functional mock-up unit may not contain a solver and the operating of the functional mock-up unit in the processing device may not involve a solver being used. This can allow output values of the virtual sensor to be provided in real time with reduced computational complexity.

Using the FMI standard to provide the virtual sensor allows the transmitter to be easily used in different platforms. Moreover, a virtual sensor including almost all software tools that support the FMI format is possible.

FMUs according to one embodiment are able to be routed out of a multiplicity of systems, for example out of systems in which model order reduction is not yet implemented.

The output value of the virtual sensor can be determined completely, i.e., accurately, by the measured value of the physical sensor and by the dataset, with no solver being required. A person skilled in the art understands that the method according to this embodiment is not limited to a single physical sensor, but rather that any number of physical sensors that are able to be used to provide a virtual sensor can be arranged on the industrial installation.

It should therefore be understood that in some exemplary embodiments it is possible for multiple physical sensors to be assigned to the industrial installation, which for example measure different physical states and/or a physical state at different locations/sites in the installation. The multiple sensors can each transmit a measured value to the processing device, which receives the measured values. The output value of the virtual sensor can be determined by the dataset and at least one other measured value from at least one other of the multiple physical sensors assigned to the industrial installation. Accordingly, the processing device can receive one measured value from each of multiple physical sensors, an output value of the virtual sensor assigned, and/or uniquely assigned, to the multiple measured values of the physical sensors being determined in the processing device on the basis of the dataset and the measured values of the multiple physical sensors. The output value can be determined completely, or accurately, by the dataset and by the multiple measured values of the physical sensors.

The generating of the dataset can be performed by a computing element that is not part of the automation system, or not part of the higher-level machine platform. In particular, the computing element can be remote, or arranged remotely, from the automation system, the dataset being transmitted from the computing element to the processing device for the purpose of storage in a permanent, in other words non-volatile, data memory in the processing device. Computationally complex simulations can therefore be performed before the virtual sensor is operated, which allows the provision in the processing device to be implemented easily and quickly.

According to another aspect, an automation system of an industrial installation is provided that is designed to provide a virtual sensor. The automation system includes at least one physical sensor assigned to the industrial installation. Further, the automation system includes a processing device configured to perform the following operations.

In a first operation, a measured value is received from the physical sensor that corresponds to a physical parameter of the industrial installation. In a further operation, a dataset is provided in the processing device that was generated by a simulation model that produces a correlation between possible measured values of the physical sensor and associated output values of the virtual sensor. In a further operation, the processing device determines, on the basis of the dataset and on the basis of the received measured value, which output value of the virtual sensor belongs to the received measured value.

The automation system includes a display apparatus configured to display the determined output value. In some exemplary embodiments, the display apparatus can be optional.

The automation system can furthermore be configured to carry out a method according to the features described under the first aspect of the embodiment.

According to another aspect, a computer program is provided that includes commands that, when the program is executed by a computing apparatus, cause said computing apparatus to carry out the method according to the features described under the first aspect of the embodiment.

For such an automation system and computer program for providing a virtual sensor it is possible to achieve technical effects that correspond to the technical effects described for the method for providing a virtual sensor.

Although specific features are described in the summary above and the detailed description below in connection with various aspects and exemplary embodiments of the present embodiments, it should be understood that the specific features of the aspects and illustrative exemplary embodiments can be used not only in the respective corresponding explicitly outlined combinations but also in other combinations or in isolation, unless expressly indicated otherwise.

The above summary is therefore supposed to provide only a brief overview of some features of some exemplary embodiments and implementations and should not be understood as limitation.

BRIEF DESCRIPTION OF THE FIGURES

The present invention is explained in more detail below on the basis of preferred exemplary embodiments with reference to the figures that follow.

In the figures, identical reference signs denote identical or similar elements. The figures are schematic depictions of various exemplary embodiments of the embodiment, the elements depicted in the figures not necessarily being depicted to scale. Rather, the various elements depicted in the figures are reproduced such that their function and general purpose becomes comprehensible to a person skilled in the art.

DETAILED DESCRIPTION OF EXEMPLARY EMBODIMENTS

Figure 1:
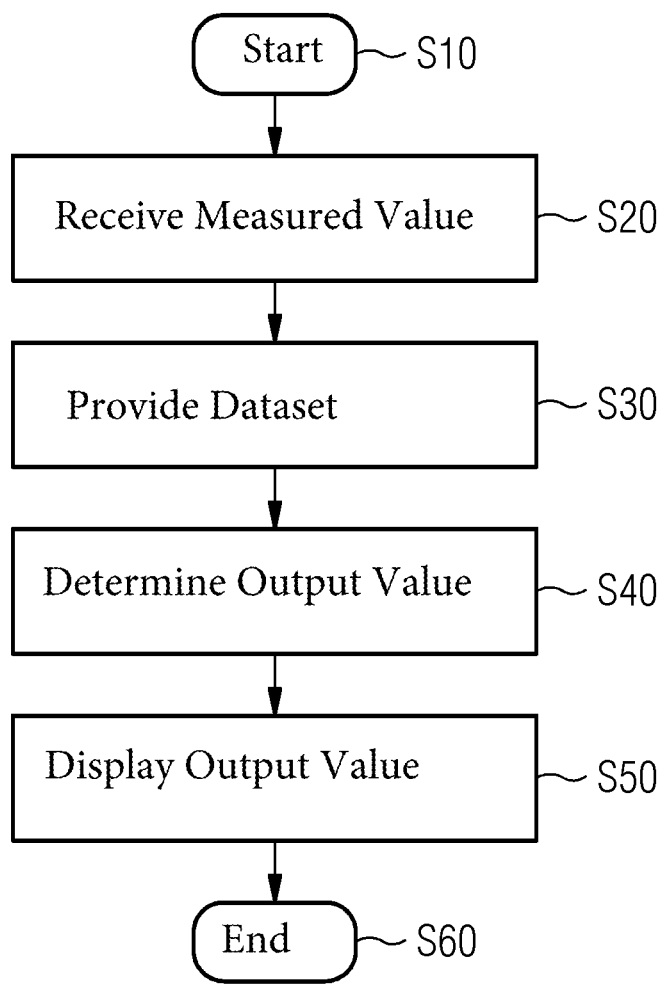
FIG. 1 shows a flowchart containing acts for providing a virtual sensor, according to exemplary embodiments.

The properties, features and advantages of this invention that are described above and the way in which they are achieved will become clearer and more distinctly comprehensible in connection with the description of the exemplary embodiments that follows, said exemplary embodiments being explained in more detail in connection with the figures.

A person skilled in the art will be able to see that the description of the exemplary embodiments should not be understood in a restrictive sense. The scope of the invention is not limited by the exemplary embodiments described below or by the figures, which serve only for illustrative purposes.

The figures should be regarded as schematic representations. Each connection or coupling between function blocks, apparatuses, components, modules or other physical or functional units depicted in the figures or described herein can also be realized by a direct or indirect connection or coupling. A coupling between the components can be produced in wired fashion or by way of a wireless connection. Function blocks, computing apparatuses, modules, or units can be implemented in hardware, firmware, software, or a combination thereof.

Various techniques for virtual sensors in an automation system, in particular techniques for providing virtual sensors that are operated to complement actual measurement data on a machine platform on a higher level than a production or machine installation, are described below.

The demands on modern machines and installations are continually rising in all sectors. Automation systems are used in order to automate technical procedures in machines, installations or technical systems.

In order to be able to monitor and control a mechanical production, it is necessary to process numerous measured values on machine components and to provide said measured values to the operator on a platform, i.e., a hardware and software computer system.

In accordance with conventional methods, measurement data can be captured by way of physical sensors on the individual machine components. Physical sensors can be mounted on machine components in this case in order to capture measurement data, e.g., by way of control units. These measurement data can be provided on a human-machine interface (HMI) or a higher-level platform, for example a machine platform, in particular an Edge computing system, or a SIMATIC Edge system. By way of example, to measure the temperature on a motor, a suitable temperature sensor can accordingly be placed on the motor at a measurement site with good thermal bonding.

On the other hand, detailed digital simulation models are created and compared against reality during machine, process, or product development already. These digital prototypes can be used to determine almost all physical quantities considered during the simulation without complex sensor setups. The measurement position or the measurement setup can be varied easily and inexpensively, and the actual process/procedure is not influenced during the measurement.

A simulation model, in particular a simulation model for 3D simulations, which often include finite element method (FEM) simulations, usually includes a multiplicity, or a system, of differential equations, possibly with constraints, that, in order to deliver results more or less in real time, are solved in as short a time as possible. In order to simulate such a model, a so-called solver needs to solve the system of differential equations. For example, a computer or computer system uses a solver function contained in the computer, or computer system, or in an FMU, in order to calculate solutions for these equations in different time intervals, said solver function delivering the states and outputs of the model over a specific period.

Increasing digitization has resulted in not only physical sensors but also virtual sensors or soft sensors being developed, which are another way of obtaining measurement data.

A soft sensor, also called a virtual sensor, is not a sensor that actually exists, but rather a dependency simulation for representative measured quantities in relation to a target quantity. The target quantity is therefore not measured directly but rather calculated on the basis of measured quantities correlating therewith and a model of the correlation.

Virtual sensors reproduce the dependency of correlating measured quantities on a target quantity. Accordingly, the target quantity is determined not using physical sensors but rather on the basis of the correlations with other measured quantities. In this case, the virtual sensor reflects the ambient state, as in the case of a simulation, in order to calculate the associated actual value of the target quantity for each state of the hardware measurement sensors. The target quantity by no means has to be a physical quantity in this case, but rather can also be a characteristic value, a trend, or an abstract quantity.

Known methods using the functional mock-up interface (FMI) can involve simulation models and also simulation results being transmitted in an abstracted form, which is the basis for virtual sensors on the basis of FMI technology. FMUs can be operated on a higher-level machine platform, such as for example an Edge computing system of an industrial production installation, and be connected to actual measurement data there.

FIG. 1 shows a flowchart containing acts for providing a virtual sensor, according to exemplary embodiments.

The method starts in act S10. In act S20, a measured value of the physical sensor that corresponds to a physical parameter of the industrial installation is received in a processing device of the automation system.

In act S30, a dataset that was generated by a simulation model, and that produces a correlation between possible measured values of the physical sensor and associated output values of the virtual sensor, is provided in the processing device.

In act S40, the processing device determines, on the basis of the dataset and on the basis of the received measured value, which output value of the virtual sensor belongs to the received measured value. In other words, the dataset is used to assign an output value of the virtual sensor to the measured value of the physical sensor.

In act S50, the determined output value is displayed on a display apparatus. The method ends in act S60.

Figure 2:
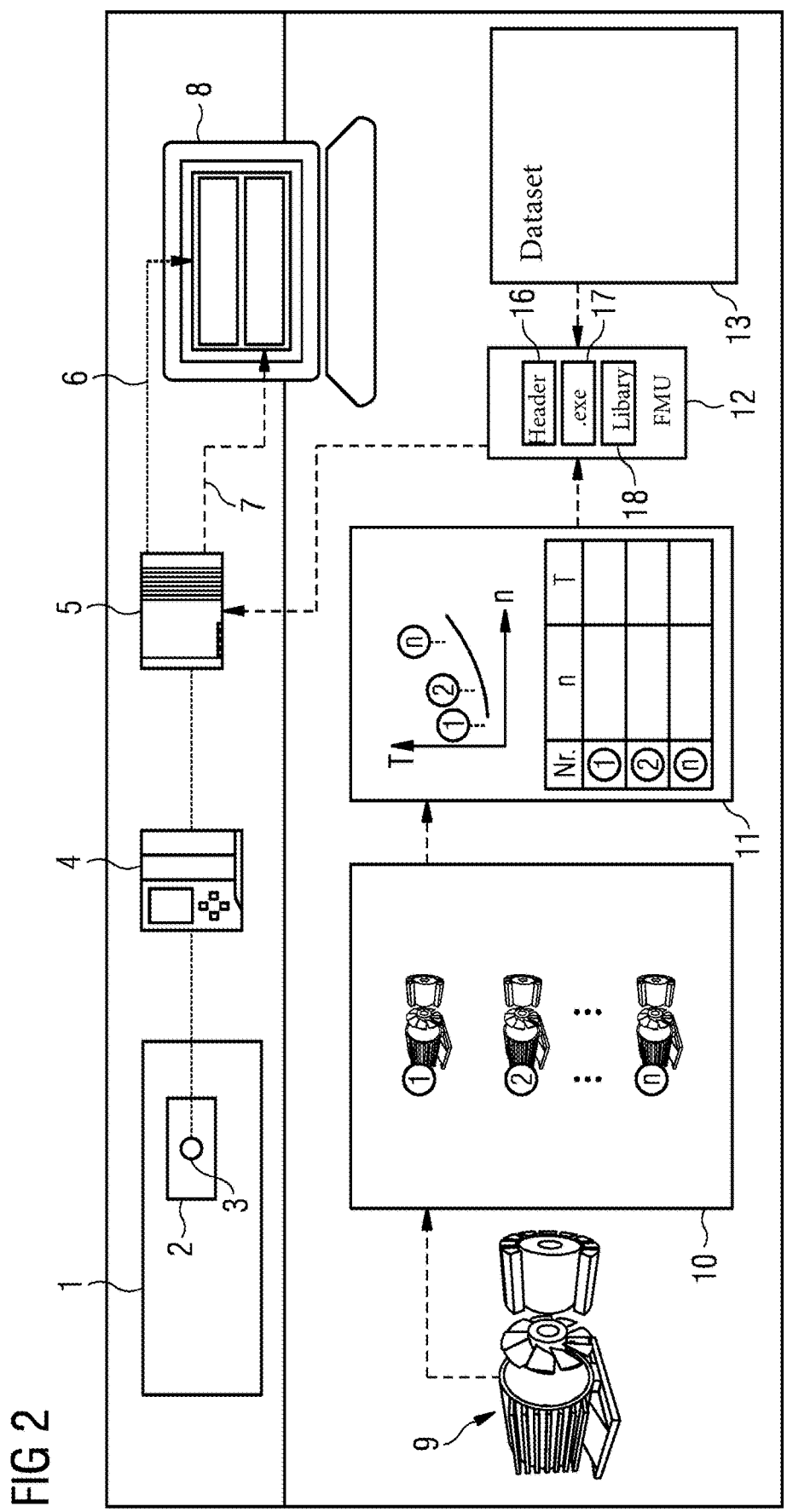
FIG. 2 shows a schematic depiction of an automation system for providing a virtual sensor, according to exemplary embodiments.

FIG. 2 shows a schematic depiction of an automation system 100 for providing a virtual sensor, according to exemplary embodiments.

As can be seen in FIG. 2, an automation system 100 of an industrial installation 1 is configured to provide actual measurement data 6 and virtual measurement data 7. An industrial installation 1 including an actual machine or installation includes a machine component 2 on which at least one physical sensor 3 is arranged.

In order to obtain measurement data during a process of the industrial installation 1, suitable physical sensors 3 in the measurement area of the industrial installation 1 are used to provide actual measurement data 6. By way of example, a measurement for a motor speed can be performed by a physical sensor 3.

The at least one physical sensor 3 is connected to at least one controller 4. Depending on the measurement principle of the physical sensor 3, signals of the sensor are forwarded to the controller 4 and converted there into a measured value, or measured values. The controller, which is connected to a processing apparatus 5 of a higher-level machine platform, takes the signals of the sensor as a basis for providing measured values to the processing apparatus 5. The measured values are therefore transmitted to the processing apparatus 5 and collected in the higher-level platform.

The processing apparatus (processor) 5 is connected to a display apparatus 8 for the purpose of visual display of the actual measurement data 6. The actual measurement data 6 can then be visually displayed in the display apparatus on a user-specific basis. This can involve the use of different systems, such as for example WinCC, a web browser or perhaps a dashboard.

As already described, the conventional method for obtaining measurement data using physical sensors 3 has a few disadvantages, such as, e.g., high costs, influencing of the process, possibly high complexity for repositioning, etc. According to the embodiment, an improved real-time-compatible way of complementing or in some cases even replacing these actual measurement data 6 with virtual sensors is provided.

Figure 3:
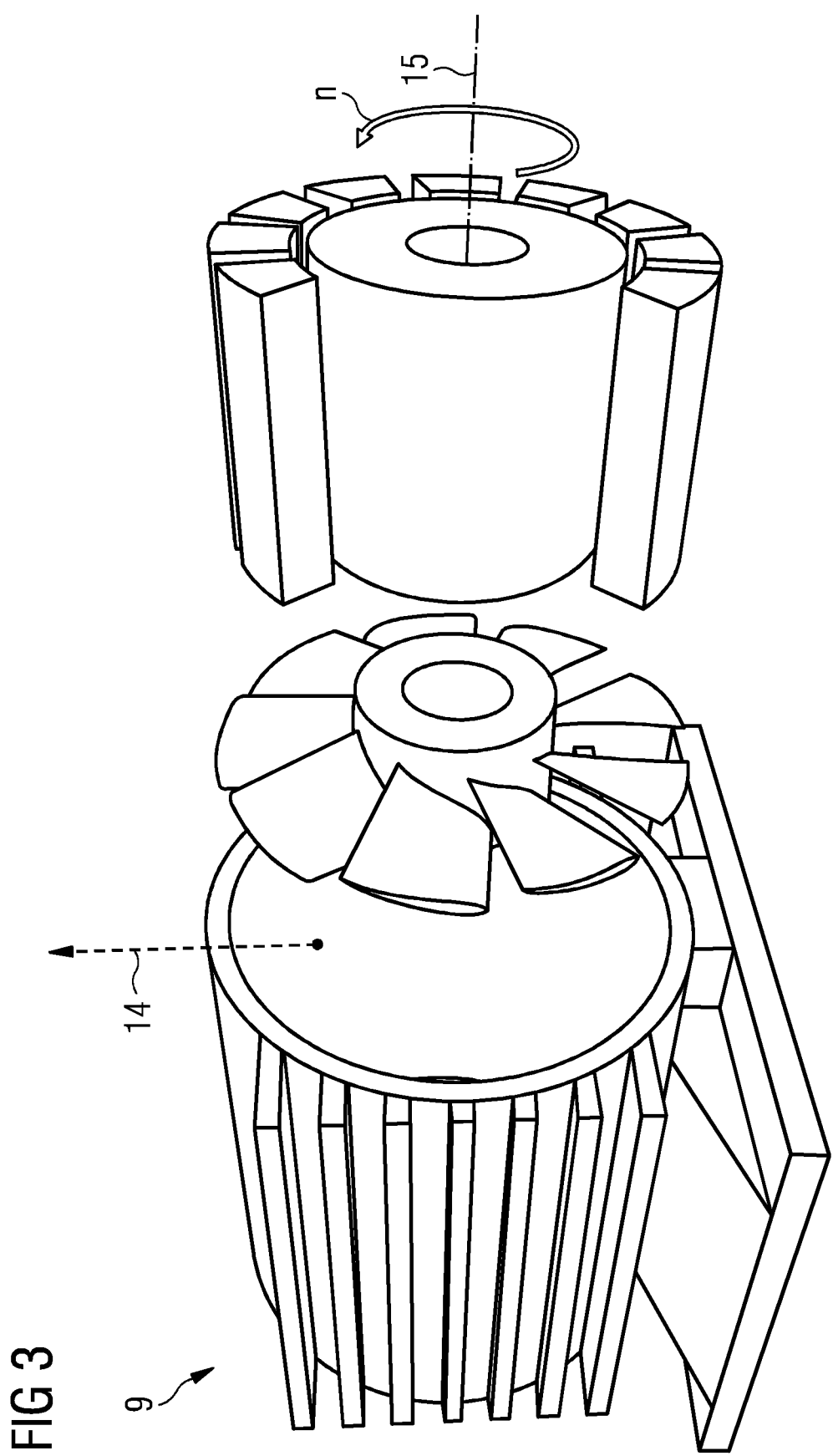
FIG. 3 shows a schematic setup for a simulation model, according to exemplary embodiments.

FIG. 3 shows a schematic setup for a simulation model 9, according to exemplary embodiments. The simulation model 9 of the object to be measured, e.g., a machine component 2 of an industrial installation 1, forms the basis for this new way of providing virtual sensors in a factory environment.

As depicted in FIG. 3, the simulation model 9, or digital prototype, of the installation 1, or of the machine component 2, is set up such that the quantity to be measured virtually, i.e., the output quantity 14, is a system response of the simulation model 9 to an input quantity 15, for example a speed n. If for example the temperature at a site on the object is supposed to be measured virtually, the calculation result of the simulation is for example the temperature at this site.

The simulation model 9 in this case produces a correlation between the virtually measured quantity 14 (e.g., temperature value at specific site) and a quantity 15 (e.g., speed n) that is actually measured later. For the case depicted by way of illustration, this means that a correlation between the speed n and the temperature can be produced in the simulation model 9. Moreover, the input quantity 15 in the range covered by the later actual measured quantity of the physical measurement by a sensor is variable, i.e., if the motor reaches a speed of between 0 and 6500 min−1 during operation, these values can also be set in the simulation model 9.

As is further depicted in FIG. 2, a multiplicity of simulation passes 10 are performed on the basis of the simulation model 9. The simulation passes 10 are performed on the basis of measured values 15 that are actually measured, for example the speed n, or other known or calculated quantities.

In this way, the simulation model 9 can ascertain the entire behavior of the input quantity 15, and of the output quantity 14, the values of which represent the output values of the virtual sensor, for a varying input quantity 15. To this end, a test plan is drawn up for a definable number of simulations, for example n=100 simulations, for example by using Latin hypercube sampling or Monte Carlo sampling, for which the input quantities are varied in the definition area, for example from 0 min−1 to 6500 min−1. Following each simulation pass, the system response, for example the temperature, is ascertained. The data thus obtained by the simulation passes 10 ultimately describe the complete correlation between the possible values of the input quantity 15 of the simulation model 9 that is actually measured later, in the example the speed, and the virtually ascertained output quantity 14 of the simulation model 9, in the example the temperature, in the definition area of the input quantity 15.

These data can then be put into a form, in a dataset 11, that can be processed quickly and efficiently later. This can firstly be a simple function graph or a table, provided that just one input and one output quantity are present. However, it may also be necessary for a metamodel or an n-dimensional function to be generated if n input and n output quantities are present.

The obtained representation of the results can also be stored in a standard format, in particular the functional mock-up interface (FMI), or in a special functional mock-up unit (FMU) 12.

FIG. 3 shows a schematic setup for a functional mock-up unit (FMU) 12, according to exemplary embodiments of the embodiment.

Figure 4:
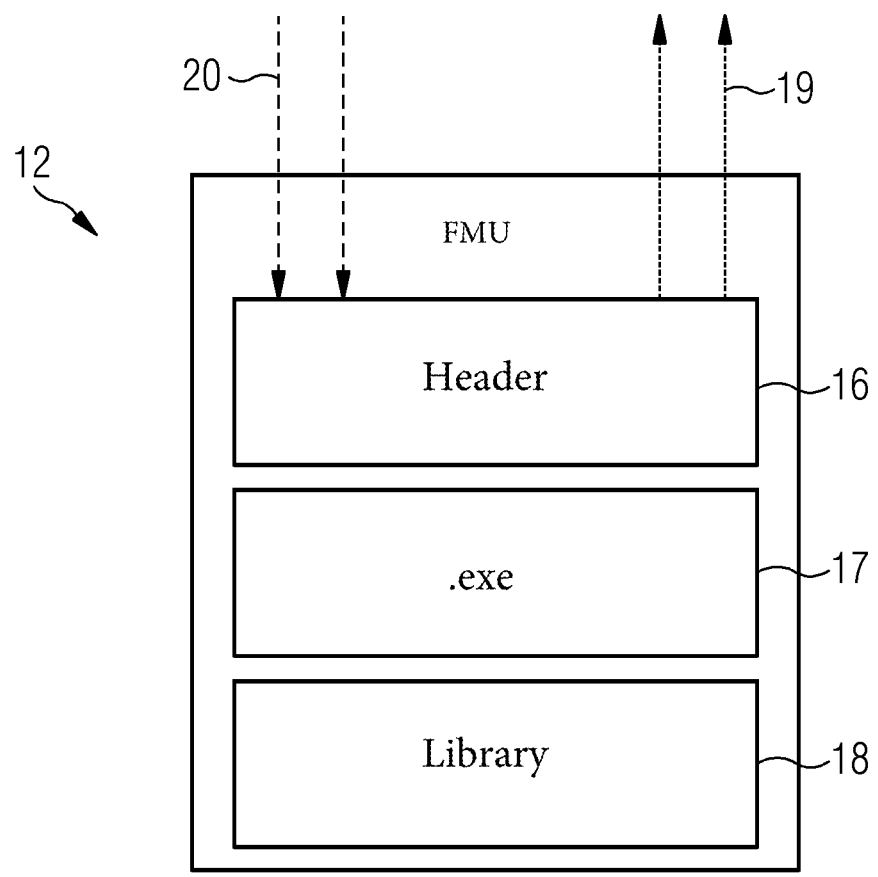
FIG. 4 shows a schematic setup for a functional mock-up unit, according to exemplary embodiments.

As depicted in FIGS. 3 and 4, this FMU 12 fundamentally consists of three essential parts: an XML header 16 for defining the input and output variables and for metainformation, the executable 17 with the program code and the library 18, which contains software libraries and the like, for example. This normally allows an FMU 12 to be operated autonomously. An FMU can conventionally contain a solver, a solver function, for the simulation of simulation models that allow a system of partial differential equations to be solved.

As can also be seen in FIG. 3, the FMU 12 is set up such that it is possible to use the stipulation of an input variable 20, which can correspond to the input quantity 15, for example, to obtain an output value of the output variable 19, which can correspond to the output quantity 14, for example, as quickly as possible. For the example shown, the input variable 20 would be the stipulated speed forwarded to the executable 17. In the executable 17, depending on the chosen knowledge representation, a value a value for the temperature is directly ascertained on the basis of a program code of the executable 17, or with access to the libraries 18 in which the dataset 11 can be stored, and is output by the FMU 12 via the output 19. Exactly how this procedure takes place in detail is dependent on the manner in which the results are represented.

In addition to this way of creating an FMU 12 on the basis of existing simulations by a simulation model 9, there is also the route of storing technical fundamental equations in the FMU.

As can be seen in FIG. 2, the FMU 12 can also store at least one dataset 13 including a technical fundamental equation, or predetermined values or parameters of the industrial installation 1, or of one or more machine components 2. This can be the nominal bearing life for the bearings in the motor, for example. If this equation is converted such that it is now dependent only on parameters that are actually (or perhaps virtually) measured on the test bench and this FMU 12 is operated on the higher-level platform, the actual measurement dataset can also be complemented in this manner.

Such FMUs 12 are normally interchanged between different simulation tools. However, other software tools can also call FMUs 12 and serve as a so-called "master" if the FMU 12 was set up in a suitable manner.

In this case, an FMU 12 can also be operated on a higher-level platform, in particular in a processing device 5 of a higher-level machine platform, which can be independent of the industrial installation 1, for the purpose of processing the actual measurement data 6. On this platform, there is then the opportunity to couple the actual measurement data 6 from the physical sensors 3 to the specifically set up FMU 12 and to operate the FMU 12 as a "virtual sensor" that directly outputs the virtual measured values 7 on the basis of the actual measured values 6.

A higher-level platform can be a higher-level machine platform, in particular an Edge computing system that is on a higher level than machines or installations 1 having physical sensors 3 and controllers 4 for signal processing. In some exemplary embodiments, the virtual sensor can accordingly be provided in an Edge device of an Edge computing system of an industrial installation.

An example of a higher-level machine platform of this kind is Siemens Industrial Edge. Siemens Industrial Edge includes the Edge Management System, one or more Edge devices, and Edge apps, which are operated on the Edge devices. The Edge Management System can be used to control all connected Edge devices centrally and to monitor the states of the industrial installation 1. Users can use the Edge Management System to install software applications (Edge apps) from the Edge app store of the backend system, for example MindSphere, in the desired Edge devices.

A Simatic Edge device, which can correspond to the processing apparatus 5, for example, is a hardware component of the Siemens Industrial Edge platform that can be operated directly on a machine, i.e., on an industrial installation, and e.g., allows data processing or data forwarding. Siemens Industrial Edge can extend automation systems by machine-level data processing and thus complement the cloud computing with the open IoT operating system "MindSphere." Accordingly, the Simatic Edge device, as a hardware platform for Edge applications, captures and processes large volumes of data, in particular data from physical sensors, directly at the machine. The Edge device is connected to the machine by integrated connectivity for automation purposes. Production data, in particular data of physical sensors, can therefore be captured and processed directly during production. Siemens Industrial Edge thus allows the installation and updating of software apps from a central Edge Management System on the Edge device. If the circumstances of the industrial application change, it is possible to adapt software apps in the Edge device. The higher-level machine platform therefore reduces the storage and transmission costs for data because large volumes of data are pre-processed and then only relevant data reach a cloud- or company-inherent IT infrastructure.

In summary, a virtual sensor is provided in an automation system. In particular, in exemplary embodiments, a so-called FMU app is operated on the Edge platform, which is basically configured to operate an FMU as a virtual sensor on an Edge computing system, such as the Simatic Edge. This can be accomplished using the standard FMU interface of many software tools, usually 1D simulations, this conventionally requiring an FMU that also includes a solver for a co-simulation, and therefore being generally not suitable for computationally complex 3D simulations. In such cases, the models can be very large, or the solving in the FMU can take a very long time. Using the method according to the embodiment, an FMU can be set up such that it does not require a solver even for complex 3D simulations, and also delivers results quickly in this case, ideally in real time. This is accomplished by having the simulation run repeatedly on the basis of the actually measured quantities, the result being how the response quantity, i.e. the sensor, behaves. This behaviour is, e.g., combined into a function, a metamodel or a simple dataset and in turn accommodated in the FMU format. The FMU set up in this way can be operated as a virtual sensor on the Edge without a solver and at high speed.

The virtual sensor according to the embodiment can be implemented using the FMI standard and is configured such that it can be operated on a higher-level platform. Within the virtual sensor, the knowledge is represented, or stored, only by a simple knowledge representation, which can in particular include a lookup table containing results of simulations performed in advance, one or more tables containing simulation data, a function graph or a technical fundamental equation.

The techniques according to the embodiment permit physical sensors to be dispensed with for components, for example motors, allowing a reduction in production costs and lower likelihood of failure on account of a sensor fault.

An additional service/license model for a higher-level machine platform is also possible based on the techniques according to the embodiment.

In particular, virtual sensors can be provided on a platform of this kind. A customer has the opportunity to additionally switch on the sensors as required in order to monitor its machine and generate additional measurement data without having to make alterations or other changes to the installation.

Other component manufacturers can access the higher-level machine platform, for which purpose licences can be allocated. In the example above, these could be not only motor manufacturers but, e.g., also bearing manufacturers.

The operator of the higher-level machine platform can develop virtual sensors for original equipment manufacturers (OEMs) of machines or machine components, the OEMs in turn offering said virtual sensors to their customers.

In this way, machine components including virtual sensors could be provided to a customer, a higher-level Edge platform as higher-level platform being another advantage for the customer of the OEM.

Manufacturers of installations or installation components can attain improvement in existing developments by virtue of virtual sensors capturing more data at the components/installations. This can result in a larger dataset for closed loop analytics, for example.

Use of simulation data that are available anyway, and hence better utilization of existing data, is thus made possible.

It is therefore possible to improve the efficiency, flexibility and economic viability of automation installations by operating virtual sensors, in particular on a higher-level machine platform, during production, and also with regard to small changes to the industrial installation that are needed in the short term.

The invention claimed is:

1. A method for providing a virtual sensor in an automation system of an industrial installation, the method comprising:
calculating a dataset using a simulation model, wherein the dataset comprises output values based on a varying of possible measured values of a physical sensor over a predetermined definition area; and
storing the dataset,
wherein the dataset produces a correlation between possible measured values of the physical sensor and the associated output values of the virtual sensor;
receiving, in a processing device of the automation system, a first measured value of the physical sensor that corresponds to a physical parameter of the industrial installation;
providing the dataset in the processing device;
determining, in the processing device, on the basis of the dataset and on the basis of the received first measured value, which output value of the virtual sensor belongs to the received first measured value; and
displaying, on a display apparatus, the determined output value.

2. The method as claimed in claim 1, wherein the calculating of the dataset comprises performing of a predetermined number of calculations using the simulation model and using a Latin hypercube sampling method or a Monte Carlo sampling method.

3. The method as claimed in claim 1, wherein the providing of the dataset provides for the simulating of the values of the dataset to result in the output values of the virtual sensor relating to a single sensor point, such that, during the simulation of the dataset, values relating to the sensor point are fixed to constant values, the sensor point being assigned to a specific location of the virtual sensor, as a result of which the output values of the virtual sensor relate to a single sensor point.

4. The method as claimed in claim 1, wherein the providing of the dataset comprises a reading of the dataset from a permanent memory of the processing device, and wherein the dataset comprises at least one of the following elements: a lookup table, a linear function, an n-dimensional function and a technical fundamental equation, which assign each of the possible measured values of the physical sensor an associated output value of the virtual sensor.

5. The method as claimed in claim 1, wherein the dataset is provided in a functional mock-up unit, and/or wherein the virtual sensor is operated in the processing device by way of the functional mock-up interface (FMI) standard.

6. The method as claimed in claim 5, wherein the functional mock-up unit comprises: an extensible markup language header, an executable, and at least one library.

7. The method as claimed in claim 5, wherein the functional mock-up unit does not perform a simulation.

8. The method as claimed in claim 1, wherein the determined output value of the virtual sensor is determined completely by the first measured value of the physical sensor and the dataset.

9. The method as claimed in claim 1, wherein the processing device is part of a machine platform on a higher level than the industrial installation.

10. The method as claimed in claim 1, wherein the displaying of the determined output value comprises also displaying of the received first measured value.

11. The method as claimed in claim 1, wherein the generating of the dataset is performed by a computing element that is remote from the automation system, and wherein the dataset is transmitted to the processing device for storage in the processing device.

12. An automation system of an industrial installation, the automation system comprising:
- a memory configured to store a dataset formed from a simulation model, wherein the dataset comprises output values of a virtual sensor based on a varying of possible measured values of a physical sensor, wherein the dataset is arranged to produces a correlation between the possible measured values of the physical sensor and the associated output values of the virtual sensor,
- the physical sensor configured to provide a first measured value, the first measured value corresponding to a physical parameters of the industrial installation,
- a processing device configured to determine on the basis of the dataset and on the basis of the first measured value, which output value of the virtual sensor belongs to the first measured value; and
- a display apparatus configured to display the determined output value.

13. The automation system of claim 12 wherein the dataset corresponds to the virtual sensor at a single location on the industrial installation.

14. The automation system of claim 12 wherein the memory is a permanent memory of the processing device, and wherein the dataset comprises at least one of the following elements: a lookup table, a linear function, an n-dimensional function and a technical fundamental equation, which assign each of the possible measured values of the physical sensor an associated output value of the virtual sensor.

15. The automation system of claim 12 wherein the dataset is provided in a functional mock-up unit, and/or wherein the virtual sensor is operated in the processing device by way of the functional mock-up interface (FMI) standard.

16. The automation system of claim 15 wherein the functional mock-up unit comprises: extensible markup language header, an executable, and at least one library.

17. The automation system of claim 15 wherein the functional mock-up unit does not perform a simulation.

18. The automation system of claim 12 wherein the processing device is configured to determine the determined output value of the virtual sensor completely from the first measured value of the physical sensor and the dataset.

19. The automation system of claim 12 wherein the processing device is part of a machine platform on a higher level than the industrial installation.

* * * * *